United States Patent [19]

Goebel et al.

[11] Patent Number: 5,006,428

[45] Date of Patent: Apr. 9, 1991

[54] GETTER ELECTRODE AND IMPROVED ELECTROCHEMICAL CELL CONTAINING THE SAME

[75] Inventors: Franz Goebel, Sudbury; Sohrab Hossain, Marlboro, both of Mass.

[73] Assignee: Yardney Technical Products, Inc., Pawcatuck, Conn.

[21] Appl. No.: 442,033

[22] Filed: Nov. 28, 1989

[51] Int. Cl.$^5$ .............................................. H01M 2/16
[52] U.S. Cl. .................................... 429/101; 429/145; 429/248
[58] Field of Search ......................... 429/145, 248, 101

[56] References Cited

U.S. PATENT DOCUMENTS

| | | | |
|---|---|---|---|
| 2,903,497 | 9/1959 | Comano | 429/145 |
| 4,743,520 | 5/1988 | Rosansky | 429/145 |
| 4,812,375 | 3/1989 | Foster | 429/101 |
| 4,830,935 | 5/1989 | Bergum | 429/101 |

Primary Examiner—Donald L. Walton
Attorney, Agent, or Firm—Donald E. Nist

[57] ABSTRACT

A getter electrode is provided to prevent dendrite formation and growth in electrochemical cells having alkali metal anodes such as lithium. The getter electrode includes a relatively thin, for example, about 2 mil thick layer of active material selected from the group consisting of carbon, graphite and mixtures thereof disposed on an inert substrate such as glass fiber separator paper. The getter electrode is positioned between the anode and the cathode in the cell and is separated from the anode and cathode by separators of fiberglass paper or the like. The getter electrode functions as a cathode with low rate capabilities. When dendrites arrive at the getter electrode from the anode or cathode, they are immediately discharged and not allowed to grow beyond the getter electrode. The result is a dramatic improvement in the cell cycle life and capacity retention.

9 Claims, 1 Drawing Sheet

GETTER ELECTRODE AND IMPROVED ELECTROCHEMICAL CELL CONTAINING THE SAME

BACKGROUND OF THE INVENTION

1. Field of the Invention

The present invention generally relates to electrochemical cells and more particularly to a getter electrode for such a cell.

2. Prior Art

A generic problem for electrochemical cells employing alkali metal anodes such as lithium is dendrite formation by electrolysis during charge and overdischarge of the cell. During discharge, lithium dissolution occurs. On cell reversal and cell charge, the electrochemical formation of lithium from lithium-containing electrolytic solutions occurs in the form of finely divided dendrite-like material which has the ability to grow in length and pass through microporous separators, eventually causing premature cell failure or even fire and explosion by forming electrical shorts.

For the safe and efficient operation of cells which use an alkali metal anode, dendritic growths have to be eliminated under any circumstances.

SUMMARY OF THE INVENTION

The getter electrode of the present invention and the electrochemical cell employing the same satisfy the foregoing needs. The cell is run safely and efficiently due to the presence of the getter electrode. As set forth in the Abstract of the Disclosure, the getter electrode comprises a relatively thin, for example about 1–5 mil thick, layer of a material which acts as a relatively low rate capability cathode in the cell. The material is selected from the group consisting of carbon, graphite and mixtures thereof and is disposed on an inert carrier such as a sheet of glass fiber separator paper or the like.

The getter electrode is positioned between the anode and the cathode in the cell and is shielded from the anode and cathode by separators. Preferably, the getter electrode is sufficiently large and is positioned so as to protect all the surface area of the positive and negative electrodes in the cell. There is a getter electrode in the cell for each such pair of positive and negative electrodes in the cell.

Further features of the getter electrode and the cell containing the same are set forth in the following detailed description and the accompanying drawings.

DRAWINGS

FIG. 1 is a schematic front elevation, partly broken away, of a preferred embodiment of the improved electrochemical cell of the present invention and the getter electrode used in the cell; and, FIG. 2 is a schematic, fragmentary, enlarged side elevation of a portion of the getter electrode used in the cell of FIG. 1.

DETAILED DESCRIPTION

Figure 1:
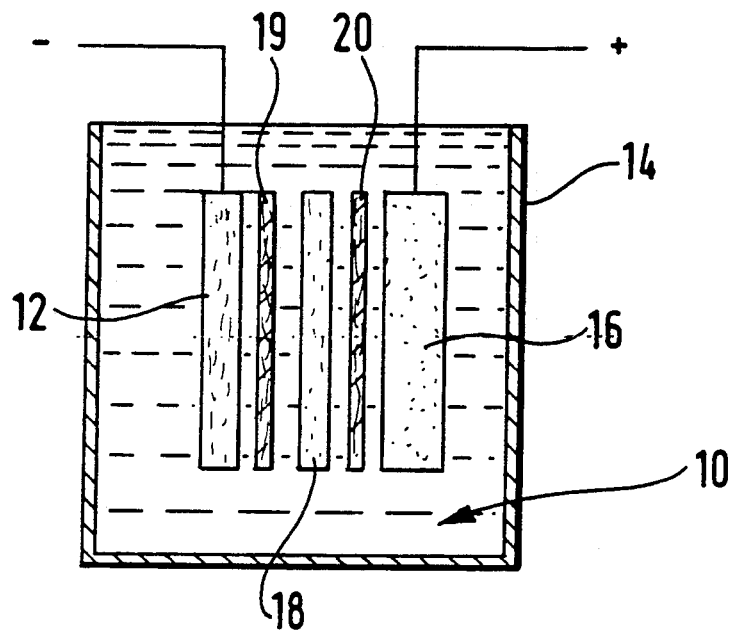
Figure 2:
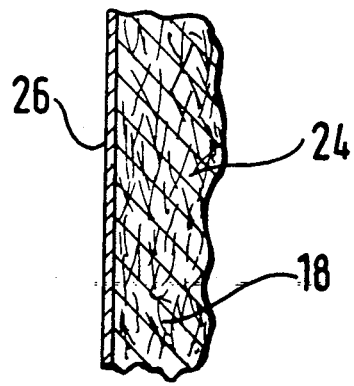

FIGS. 1 and 2.

Now referring more particularly to FIGS. 1 and 2 of the drawings, a preferred embodiment of the improved electrochemical cell of the present invention and the getter electrode of the present invention used in the cell are shown schematically. Thus, electrochemical cell 10 is shown, which includes anode 12 of lithium metal spaced in the hollow interior of a container 14 from a cathode or cathodic current collector 16 comprising carbon.

A getter electrode 18 is positioned between and spaced from anode 12 and cathode 16, being separated therefrom by a pair of porous glass fiber separators 19 and 20. Separators 19 and 20 are electrically non-conductive. Cathode 16 may be formed of carbon black and a binder such as polytetrafluoroethylene into a porous self-supporting structure. Electrodes 12, 16 and 18 and separators 19 and 20 in the hollow interior of container 14 are bathed in an electrolyte solution which may be, for example, 0.9 molar lithium tetrachloraluminate in thionyl chloride.

Getter electrode 18 comprises a glass fiber separator 24 which has been deposited with a thin film or layer 26, for example, about 1–5 mils thick and most preferably about 2 mils thick of material selected from the group consisting of carbon, graphite and mixtures thereof.

The getter electrode 18 functions as a cathode of low rate capability. When lithium dendrites arrive at the getter electrode 18 from the anode 12 or cathode 16, depending on whether charging or overdischarging is taking place in cell 10, such lithium dendrites will be immediately discharged upon contact with getter electrode 18. For Example, in lithium-thionyl chloride systems, they will form lithium chloride, sulfur dioxide and sulfur according to the equation: $4\ Li + 2\ SOCl_2 \rightarrow 4LiCl + SO_2 + S$.

Such discharge rate should be sufficiently low in order to prevent overheating and melting of the dendrite, with attendant dangers but should be sufficiently high so as to exceed the rate at which the dendrite is formed, in order to prevent any growth beyond getter electrode 18 in the cell 10, and short circuiting of the cell. The rate capability of getter electrode 18 can be controlled by the thickness and surface area of the carbon and/or graphite layer in the getter electrode.

The following two specific examples illustrate in detail for the primary non-rechargeable and secondary rechargeable lithium-containing electrochemical cells of the present invention employing the getter electrode of the present invention:

EXAMPLE 1

An electrochemical cell was constructed comprising a carbon electrode, a lithium metal anode, a 0.9 molar solution of lithium tetrachloroaluminate in thionyl chloride as the electrolyte and a getter electrode comprising a 2 mil thick layer of carbon deposited on a glass fiber separator, with glass fiber separators between the getter electrode and the anode and cathode. The cell was functionally tested against an identical cell without the getter electrode.

The cell having the getter electrode showed dramatic improvement in safety aspects and capacity retention against the cell not having the getter electrode which shorted and vented during overdischarge due to dendritic penetration, thus illustrating the improved properties of the getter electrode and the cell containing it.

EXAMPLE 2

Two identical cells, one with the carbon getter electrode and the other without the carbon getter, were constructed with a carbon black cathode and lithium anode and were tested in $Li\ Al\ Cl_4/SO_2$ electyrolyte to evaluate their cycle life and capacity performance. The cells operated at 1.0 mA/cm$^2$ charge and discharge rates within the voltage limits of 2.8-4.0 V vs. Li. The cell without the carbon getter was shorted during charge after completion of 72 discharge cycles, and lost a capacity of 36%.

The cell with the carbon getter electrode, on the other hand, completed 101 cycles and failed to continue cycling as a result of cathode polarization. For comparison, the capacity loss after 72 cycles with that cell was only 21%. The indicated comparative results of cycle life and capacity performance thus illustrate the improved characteristics of the getter electrode and the cell containing it.

Various other modifications, alternations, changes and additions can be made in the improved getter electrode and electrochemical cell of the present invention and in the components and parameters thereof. All such modifications, changes, alterations and additions as are within the scope of the appended claims form part of the present invention.

What is claimed is:

1. A getter electrode to prevent dendrite formation in electrochemical cells having alkali metal anodes, such dendrite formation otherwise normally occurring during cell charging and overdischarging, said getter electrode comprising a relatively thin low rate capability layer of active material selected from the group consisting of carbon, graphite and mixtures thereof disposed on an inert substrate.

2. The getter electrode of claim 1 wherein said layer is about 1-5 mils in thickness.

3. The getter electrode of claim 2 wherein said layer is about 2 mils thick.

4. The getter electrode of claim 2 wherein said substrate comprises glass fiber separator paper and wherein said alkali metal is lithium.

5. An improved dendrite formation-resistant electrochemical cell employing an alkali metal anode, said cell also including a cathode spaced from said anode and electrolyte communicating with said anode and cathode, said cell including a getter electrode disposed between said anode and cathode and shielded by separators between said getter electrode and said anode and cathode, said getter electrode comprising active material selected from the group consisting of carbon, graphite and mixtures thereof disposed as a thin low rate capability layer on an inert substrate.

6. The improved electrochemical cell of claim 5 wherein said layer is about 1-5 mils thick.

7. The improved electrochemical cell of claim 6 wherein said layer is about 2 mils thick.

8. The improved electrochemical cell of claim 5 wherein said anode is lithium, wherein said cathode is carbon, wherein said inert substrate is glass fiber paper and wherein said electrolyte is lithium tetrachloroaluminate in thionyl chloride and/or sulfur dioxide solvents.

9. The improved electrochemical cell of claim 8 wherein said separators are porous glass fiber paper.

* * * * *